No. 625,300. Patented May 16, 1899.
G. B. HEATH.
ELECTRIC TRACK AND WHEEL BRAKE.
(Application filed Aug. 27, 1898.)
(No Model.)
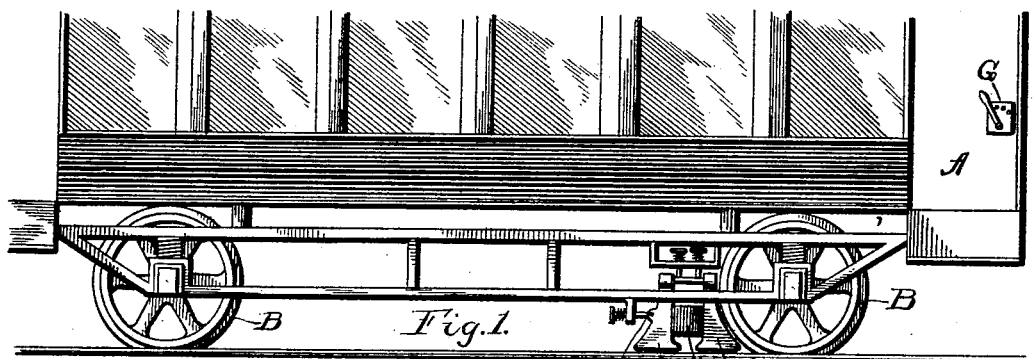
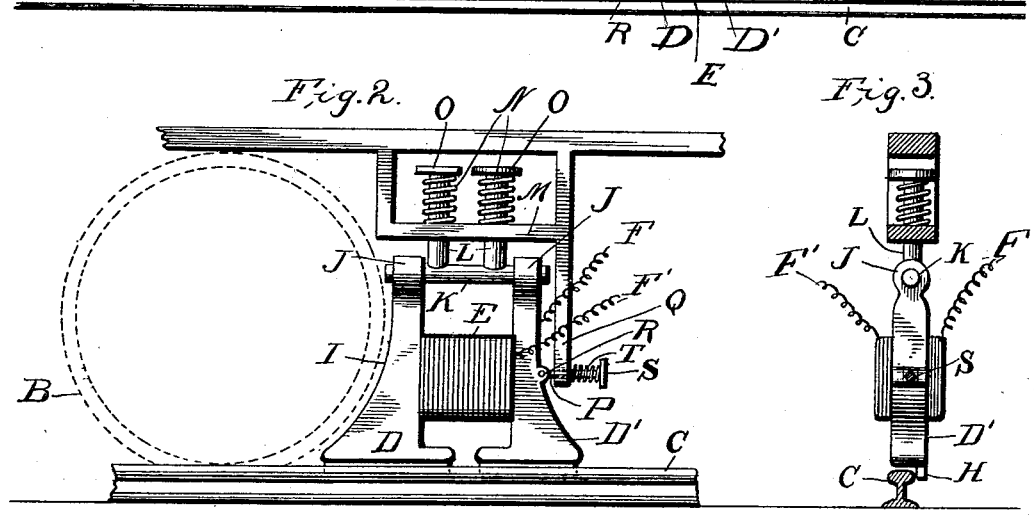
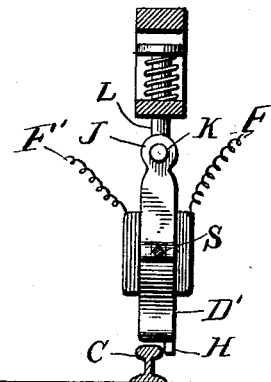
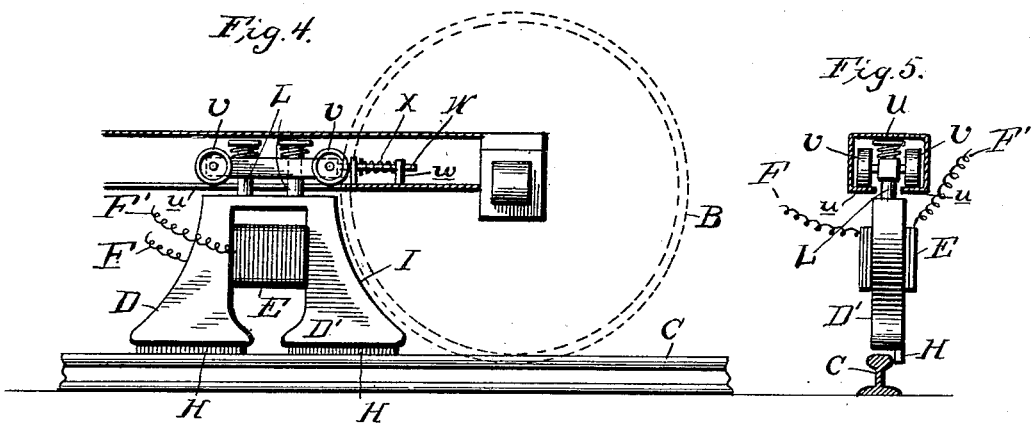
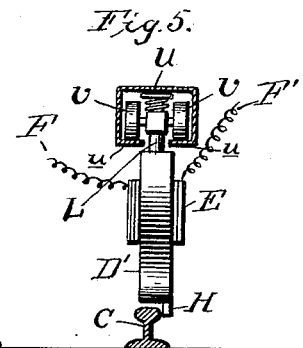
Witnesses
L. C. Hills.
J. B. Malnati.
Inventor
George B. Heath
by E. H. Bond
Attorney

UNITED STATES PATENT OFFICE.

GEORGE B. HEATH, OF SAN FRANCISCO, CALIFORNIA.

ELECTRIC TRACK AND WHEEL BRAKE.

SPECIFICATION forming part of Letters Patent No. 625,300, dated May 16, 1899.

Application filed August 27, 1898. Serial No. 689,680. (No model.)

*To all whom it may concern:*

Be it known that I, GEORGE B. HEATH, a citizen of the United States, residing at San Francisco, in the county of San Francisco and State of California, have invented certain new and useful Improvements in Electric Track and Wheel Brakes; and I do hereby declare the following to be a full, clear, and exact description of the invention, such as will enable others skilled in the art to which it appertains to make and use the same.

This invention relates to certain new and useful improvements in electric brakes; and it has for its object, among others, to provide a simple, inexpensive, and reliable combination track and wheel brake which will also prevent skidding of the wheels.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of a car provided with my improved combination-brake. Fig. 2 is an enlarged detail of the brake mechanism. Fig. 3 is an end view of the same. Fig. 4 is an elevation showing a different manner of mounting the brake. Fig. 5 is a view of Fig. 4, partly in end elevation and partly in vertical section.

Like letters of reference indicate like parts throughout the several views.

Referring now to the details of the drawings by letter, A designates a car of known construction, B the wheels thereof, and C the track-rail.

My improved brake is shown in this instance as applied to the frame of the truck; but it is evident that it may be otherwise supported in position, as circumstances may require.

As herein illustrated, the brake comprises two electromagnets D and D', which serve as the magnetic brake-shoes adapted to contact with the track-rail, and the coil E, disposed between the two magnets, is connected by the wires F and F' with a controller G on the end of the car, as seen in Fig. 1, so that when the current is turned on from the controller the magnets are energized, which draws them to the rail. The brake shoes or magnets are lengthened at their lower end where they are designed to contact with the rail, so as to increase the contact-surface, and, as seen in Fig. 3, are preferably provided with the flanges H, which serve to keep them more positively in their proper position with relation to the track.

The shoe or magnet which is nearest the wheel of the car is curved upon its outer face—that adjacent the wheel—as indicated at I, for a purpose which will soon be made apparent.

The shoes or magnets at their upper ends are formed or provided with the boxes or bearings J, in which is supported the shaft K, and upon which shaft these bearings, and consequently the shoes, have play lengthwise of the shaft and of the track. This shaft is supported from the lower ends of the vertical rods or supports L, which are mounted for vertical movement in the longitudinal timber M, supported from the under side of the frame of the truck or other suitable support, and around these rods are the springs N, disposed between the timber M and heads or collars O on the upper ends of the rods, and which springs serve to hold the shoes or magnets away from the track when not in use. It will thus be seen that the magnets or shoes have a vertical movement bodily and that they also have a movement lengthwise of the track upon the shaft K.

P is a rod mounted to slide through a suitable opening in the lower end of the hanger Q, supported from the under side of the frame of the truck or other support, as seen best in Fig. 2, and this rod is pivotally connected, as at R, with the adjacent shoe or magnet, while around the said rod, between the hanger and a head or collar S on the outer end of the rod, is a spring T, which serves to keep the brake away from the wheel when not in use.

A greater or less number of these brakes may be employed upon a car, as may be found most expedient.

With the parts constructed and arranged substantially as above described the operation will be readily understood, and, briefly stated, is as follows: Normally the parts are in the position in which they are shown in Fig. 2. The shoes are elevated from the track and held away from the wheel. When the current is turned on, the magnets are magnetized and draw to the rail. The wheel, running into the curve of the shoe next adjacent thereto, throws the weight of the car onto the track-shoes and prevents sliding of the wheel on the rail, and flattening or skidding of the wheel is prevented. The shoes or magnets move endwise of the track on the shaft K. The pivotal connection of the rod P with the brake-shoe permits of the requisite movement of the shoe. When the current is shut off, the springs N and T return the parts to their normal position.

It will thus be seen that I provide a combined track and wheel brake that not only serves its function most satisfactorily, but which at the same time will prevent flattening of the wheels, as is so common the result by reason of sliding of the wheels.

Modifications in detail may be resorted to without departing from the spirit of the invention or sacrificing any of its advantages.

In Figs. 4 and 5 I have shown how the brake may be mounted so as to be used with either the front or rear wheels of the truck. In these views the magnetic shoes and the coil are the same; but I provide a casing U, having the flanges u, upon which are designed to travel the wheels or rollers V. The wheels are mounted at opposite ends of the bar through which the rods L have vertical play, as in the form shown in the other views. The rod W in this instance instead of being pivoted to the brake-shoe, as is the rod P in the other instance, is disconnected therefrom and moves through the support w, the spring X being coiled around the rod to normally hold the brake away from the wheel. The rollers travel freely within the casing and allow either wheel to work in connection with the brake.

What is claimed as new is—

1. In an electric brake, a brake-shoe carrying a coil and serving as a magnet and mounted for vertical movement in a relatively-fixed guide and also for independent movement lengthwise of the track in a relatively-fixed guide, combined with means for normally holding the shoe against such movements, substantially as specified.

2. In an electric brake adapted to contact simultaneously with both the track and wheel, a brake-shoe carrying a coil and serving both as a magnetic track-brake and as a wheel-brake and mounted for vertical and endwise movement in relatively-fixed guides, combined with means for normally holding said shoe against such movements, and electrical connections for moving the shoe in opposition to such means, substantially as specified.

3. In an electric brake adapted to act upon both the track and wheel, a brake-shoe carrying a coil and serving both as a magnetic track-brake and as a wheel-brake and mounted for vertical and endwise movements in relatively-fixed guides and having a rounded face adjacent the wheel, combined with springs for normally holding the shoe away from the track and wheel, and electrical connections for moving the shoe against the action of said springs, as set forth.

4. The combination with the magnetic brake-shoe serving as both a track and wheel brake, and its coil, of springs for normally holding the shoe away from the track, electrical connections with the coil and a controller, a rod and a spring around said rod for normally holding the shoe away from the wheel, substantially as specified.

5. In an electric brake adapted to contact with both the track and wheel, a brake-shoe carrying a coil and serving both as a magnetic track-brake and as a wheel-brake and mounted for vertical and independent endwise movements, and means for moving the shoe in contact with the track and also in engagement with the wheel to throw the weight of the car upon the shoe and prevent sliding of the wheel, substantially as specified.

6. A combined electric track and wheel brake and a coil carried by said brake, the brake being vertically movable and slidingly mounted in relatively-fixed guides to serve with either the front or rear wheels of a truck.

7. The combination with a coil, of a shoe carrying the same and serving as a magnetic brake for the track and as a wheel-brake, a support through which extensions on the shoe are adapted to work vertically, springs around said extensions for normally holding the shoe up, guides for the said shoe in its movements to and from the wheel, means for normally holding the shoe away from the wheel, and electrical connections substantially as described whereby the shoe is drawn toward the rail and against the wheel simultaneously, as set forth.

In testimony whereof I affix my signature in presence of two witnesses.

GEORGE B. HEATH.

Witnesses:
ANDREW T. SHERWOOD,
LEONARD S. CLARK.